US012705984B2

(12) United States Patent
Safari

(10) Patent No.: US 12,705,984 B2
(45) Date of Patent: Aug. 11, 2026

(54) INFORMATION PROCESSING APPARATUS, INFORMATION PROCESSING METHOD, AND PROGRAM

(71) Applicant: Sony Group Corporation, Tokyo (JP)

(72) Inventor: Daniel Safari, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 7 days.

(21) Appl. No.: 18/832,611

(22) PCT Filed: Dec. 22, 2022

(86) PCT No.: PCT/JP2022/047284
§ 371 (c)(1),
(2) Date: Jul. 24, 2024

(87) PCT Pub. No.: WO2023/145328
PCT Pub. Date: Aug. 3, 2023

(65) Prior Publication Data
US 2025/0104565 A1 Mar. 27, 2025

(30) Foreign Application Priority Data
Jan. 31, 2022 (JP) ................................ 2022-013085

(51) Int. Cl.
*G08G 5/00* (2025.01)
*G01C 21/36* (2006.01)

(52) U.S. Cl.
CPC ............... *G08G 5/00* (2013.01); *G01C 21/36* (2013.01)

(58) Field of Classification Search
CPC .... G01C 21/20; G01C 21/36; G01C 21/3807; G01C 21/3833; G08G 5/00; G08G 5/21; G08G 5/22; G08G 5/26; G08G 5/32; G08G 5/34; G08G 5/53; G08G 5/55; G08G 5/57; G08G 5/59; G08G 5/74; G08G 5/76;
(Continued)

(56) References Cited

U.S. PATENT DOCUMENTS

2019/0122569 A1* 4/2019 Villele .................. B64D 45/04
2019/0129449 A1* 5/2019 Kahn ..................... G05D 1/105
(Continued)

FOREIGN PATENT DOCUMENTS

JP 2019-089538 A 6/2019
JP 2020-009085 A 1/2020
WO WO-2019004416 A1 * 1/2019 ............ G09B 29/10

OTHER PUBLICATIONS

Machine Translation of WO 2019004416 A1 obtained from Clarivate Analytics on Sep. 27, 2025 (Year: 2019).*
(Continued)

*Primary Examiner* — Fadey S. Jabr
*Assistant Examiner* — Michael J Herrera
(74) *Attorney, Agent, or Firm* — XSENSUS LLP

(57) ABSTRACT

To generate a more efficient movement route.
An information processing apparatus including: an acquisition unit that acquires, from a mobile object, environment information that affects movement of the mobile object; and a generation unit that generates route information capable of minimizing energy required for the movement of the mobile object in a route between a first point and a second point set in advance on the basis of the environment information.

15 Claims, 11 Drawing Sheets

(58) Field of Classification Search
CPC .......... G08G 5/80; G16Y 10/40; G16Y 20/20; G16Y 40/60
See application file for complete search history.

(56) References Cited

U.S. PATENT DOCUMENTS

| | | | | |
|---|---|---|---|---|
| 2019/0147753 | A1* | 5/2019 | Hendrian | G08G 5/21 701/14 |
| 2020/0233439 | A1* | 7/2020 | Ivanov | G08G 5/26 |
| 2021/0012399 | A1* | 1/2021 | Machida | G01C 21/3461 |
| 2021/0287559 | A1* | 9/2021 | Jeong | G06V 10/25 |
| 2021/0291982 | A1* | 9/2021 | Tan | G08G 5/55 |
| 2021/0309364 | A1* | 10/2021 | Lei | G08G 5/22 |
| 2024/0257655 | A1* | 8/2024 | Takemura | G08G 5/21 |

OTHER PUBLICATIONS

International Search Report and Written Opinion mailed on Jan. 31, 2023, received for PCT Application PCT/JP2022/047284, filed on Dec. 22, 2022, 09 pages including English Translation.

* cited by examiner

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | −5 | 0 | 0 | 0 | 0 | −2 | 0 | 0 |
| 0 | 0 | −7 | 0 | +8 | 0 | +14 | −1 | 0 | 0 |
| 0 | 0 | −4 | 0 | +10 | −1 | +15 | 0 | 0 | 0 |
| 0 | 0 | 0 | 0 | 0 | −2 | 0 | 0 | +4 | 0 |
| 0 | +10 | 0 | −2 | −1 | 0 | 0 | 0 | +6 | 0 |
| 0 | +11 | 0 | −3 | −2 | 0 | 0 | −3 | 0 | 0 |
| 0 | 0 | 0 | −4 | −4 | 0 | 0 | −5 | −4 | 0 |

FIG. 18

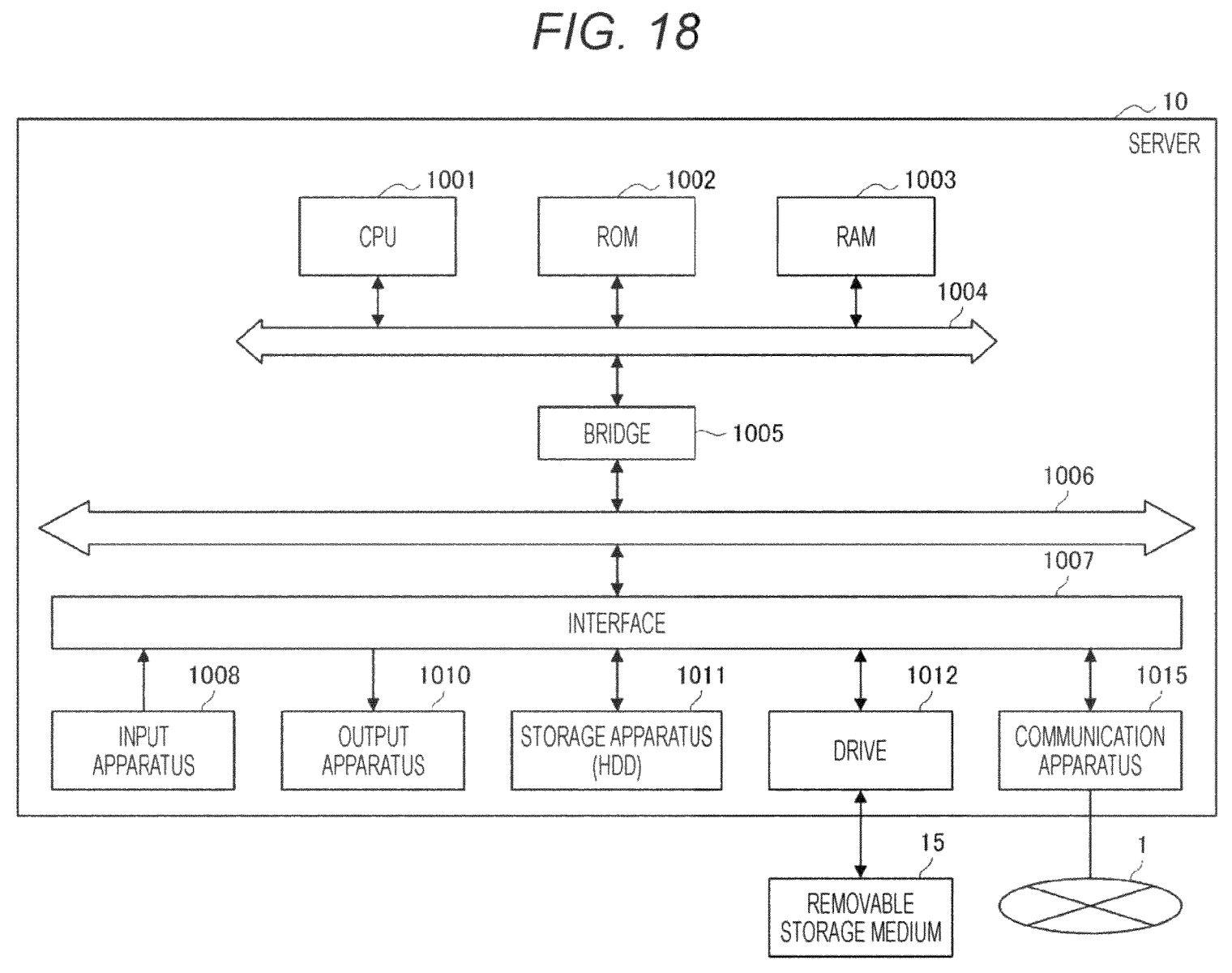

10 SERVER
1001 CPU
1002 ROM
1003 RAM
1004
1005 BRIDGE
1006
1007 INTERFACE
1008 INPUT APPARATUS
1010 OUTPUT APPARATUS
1011 STORAGE APPARATUS (HDD)
1012 DRIVE
1015 COMMUNICATION APPARATUS
15 REMOVABLE STORAGE MEDIUM
1

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2022/047284, filed Dec. 22, 2022, which claims priority to Japanese Patent Application No. 2022-013085, filed Jan. 31, 2022, the entire contents of each are incorporated herein by reference.

TECHNICAL FIELD

The present disclosure relates to an information processing apparatus, an information processing method, and a program.

BACKGROUND ART

In recent years, a technology for determining a route related to movement of a mobile object has been developed. For example, Patent Document 1 discloses a technology for determining a path linearly connecting a first point and a second point to each other as a movement route of a mobile object in a case where the second point is present on a straight course in which the mobile object goes straight from the first point when the mobile object moves from the first point to the second point.

CITATION LIST

Patent Document

Patent Document 1: Japanese Patent Application Laid-Open No. 2020-009085

SUMMARY OF THE INVENTION

Problems to be Solved by the Invention

However, in the technology described in Patent Document 1, even in a case where there is an environmental factor that adversely affects the movement of the mobile object, if the first point and the second point are on the same straight line, a path linearly connecting the points to each other is determined as the movement route.

Thus, the present disclosure proposes a new and improved information processing apparatus, information processing method, and program capable of generating a more efficient movement route.

Solutions to Problems

According to the present disclosure, provided is an information processing apparatus including: an acquisition unit that acquires, from a mobile object, environment information that affects movement of the mobile object; and a generation unit that generates route information capable of minimizing energy required for the movement of the mobile object in a route between a first point and a second point set in advance on the basis of the environment information.

Furthermore, according to the present disclosure, provided is an information processing method executed by a computer, including: acquiring, from a mobile object, environment information that affects movement of the mobile object; and generating route information capable of minimizing energy required for the movement of the mobile object in a route between a first point and a second point set in advance on the basis of the environment information.

Furthermore, according to the present disclosure, provided is a program causing a computer to implement: an acquisition function of acquiring, from a mobile object, environment information that affects movement of the mobile object; and a generation function of generating route information capable of minimizing energy required for the movement of the mobile object in a route between a first point and a second point set in advance on the basis of the environment information.

BRIEF DESCRIPTION OF DRAWINGS

FIG. 18 is a block diagram illustrating a hardware configuration of the server 10 according to the present disclosure.

MODE FOR CARRYING OUT THE INVENTION

Figure 1:
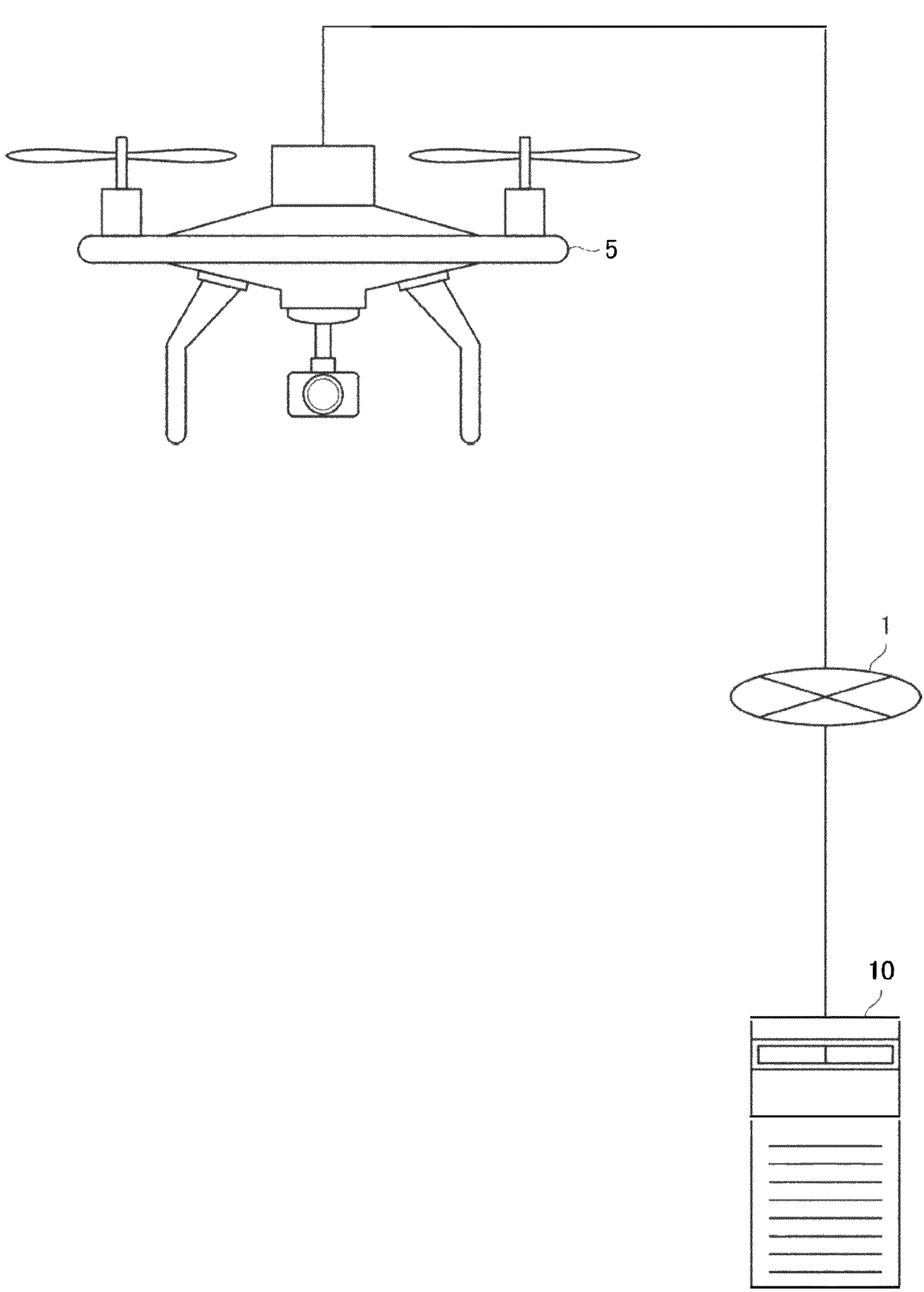
FIG. 1 is an explanatory diagram for explaining an example of an information processing system according to the present disclosure.

Hereinafter, a preferred embodiment of the present disclosure will be described in detail with reference to the accompanying drawings. Note that, in the present specification and drawings, components having substantially the same functional configuration are denoted by the same reference signs, and redundant description is omitted.

Furthermore, the "mode for carrying out the invention" will be described according to the order of items described below.

1. Outline
1.1. Outline of information processing system
1.2. Outline regarding environmental factors
1.3. Example functional configuration of drone 5
2. Example functional configuration of server 10
3. Details
3.1. Generation of environment map
3.2. Generation of route information
3.3. Update of environment map
4. Example of operation processing
4.1. Generation of environment map
4.2. Generation of route information
5. Example of functions and effects
6. Hardware configuration example
7. Supplement

1. Outline

As an embodiment of the present disclosure, a mechanism will be described of generating a more efficient movement route.

<1.1. Outline of Information Processing System>

FIG. 1 is an explanatory diagram for explaining an example of an information processing system according to the present disclosure. The information processing system according to the present disclosure includes a network 1, a drone 5, and a server 10.

(Network 1)

The network 1 is a wired or wireless transmission line for information that is transmitted from an apparatus connected to the network 1. For example, the network 1 may include public line networks such as the Internet, a telephone line network, and a satellite communication network, and various local area networks (LANs) including Ethernet (registered trademark) and a wide area network (WAN). Furthermore, the network 1 may include a dedicated line network such as an Internet protocol-virtual private network (IP-VPN). The drone 5 and the server 10 are connected to each other via the network 1.

(Drone 5)

The drone 5 according to the present disclosure is an example of a mobile object, and is an unmanned flying object that flies by autonomous control or remote control. For example, the drone 5 flies on a route between a first point and a second point set in advance by autonomous control.

For example, the drone 5 according to the present disclosure flies from the first point to the second point by autonomous control on the basis of route information received from the server 10.

Furthermore, the drone 5 estimates environment information that affects flight of the drone, and transmits the environment information to the server 10.

Note that, in the present specification, an example will be mainly described in which the mobile object is the drone 5, but the mobile object according to the present disclosure is not limited to such an example. For example, the mobile object may be an aircraft or a ship. Furthermore, the mobile object may be an unmanned machine or a manned machine.

(Server 10)

The server 10 according to the present disclosure is an example of an information processing apparatus, and receives environment information from the drone 5.

Furthermore, the server 10 generates route information capable of minimizing energy required for movement of the drone 5 in a route between the first point and the second point set in the drone 5 on the basis of the received environment information. In the following description, the first point may be expressed as a point A, and the second point may be expressed as a point B.

Furthermore, the server 10 may transmit the generated route information to the drone 5. As a result, the drone 5 may fly on a route based on the received route information.

The outline of the information processing system according to the present disclosure has been described above. Next, an outline regarding environmental factors will be described with reference to FIGS. 2 to 6.

<1.2. Outline Regarding Environmental Factors>

Figure 2:
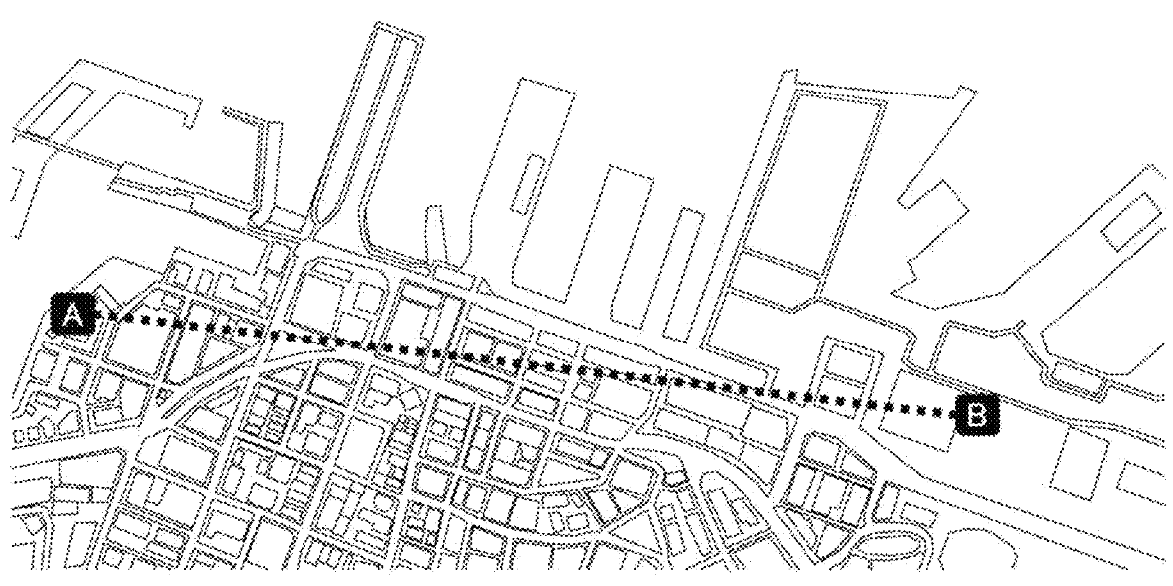
FIG. 2 is an explanatory diagram for explaining an example of a route on which a drone 5 according to the present disclosure moves.

FIG. 2 is an explanatory diagram for explaining an example of a route on which the drone 5 according to the present disclosure moves. In the example illustrated in FIG. 2, a route is set for the drone 5 to move from the point A to the point B.

For example, in a case where there is no situation that affects the flight, the drone 5 moves on a linear route (that is, a shortest route from the point A to the point B) connecting the point A to the point B as illustrated in FIG. 2, so that the energy required for the movement of the drone 5 is minimized, and more efficient flight can be performed.

On the other hand, in a case where there is a situation that affects the flight, moving on a linear route does not necessarily lead to efficient flight. Examples of such a situation include a case where there is an environmental factor that propels or hinders the flight of the drone 5.

Figure 3:
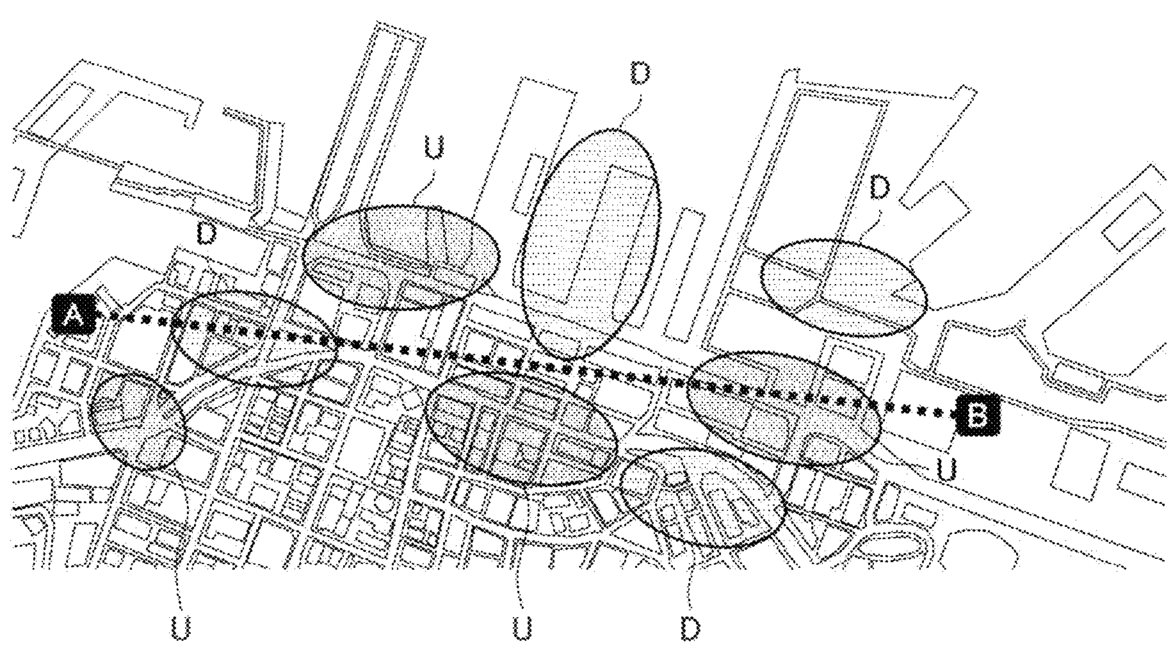
FIG. 3 is an explanatory diagram for explaining a specific example of environmental factors.

FIG. 3 is an explanatory diagram for explaining a specific example of environmental factors. For example, in an environment in which the drone 5 flies, there may be an environmental factor that affects the flight of the drone 5.

For example, in a certain flight environment as illustrated in FIG. 3, there are an area where an upward air flow U occurs and an area where a downward air flow D occurs. Such an area where the upward air flow U and the downward air flow D occur may affect the flight of the drone 5.

Figure 4:
FIG. 4 is an explanatory diagram for explaining influence of a downward air flow on flight of the drone 5.

FIG. 4 is an explanatory diagram for explaining influence of the downward air flow on the flight of the drone 5. In a case where the drone 5 flies in an area of the downward air flow, the drone 5 may need to consume additional energy to maintain an altitude. In a case where an amount of consumption of energy is not added, the drone 5 moves forward while descending as illustrated in FIG. 4.

Alternatively, in order to maintain the altitude of the drone 5, the drone 5 can also use a part of the energy for moving forward as energy for maintaining the altitude. In this case, the drone 5 may decrease a moving speed or reduce a moving distance.

As described above, there is a case where the downward air flow has an effect of hindering the flight of the drone 5. On the other hand, there is a case where the upward air flow has an effect of propelling the flight of the drone 5.

Figure 5:
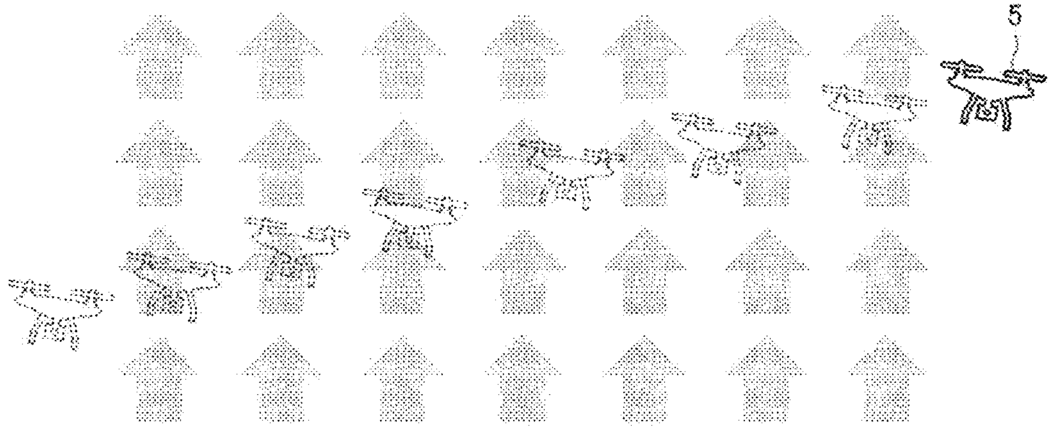
FIG. 5 is an explanatory diagram for explaining influence of an upward air flow on the drone 5.

FIG. 5 is an explanatory diagram for explaining influence of the upward air flow on the drone 5. In a case where the drone 5 flies in an area of the upward air flow, the drone 5 may be able to reduce the amount of consumption of energy for maintaining the altitude. As a result, the drone 5 may increase the moving speed or increase the moving distance by using the reduced energy.

As described above, in a case where the drone 5 moves the same distance, there is a case where the amount of consumption of energy required for movement in the area of the upward air flow is smaller than that of movement in the area of the downward air flow.

Figure 6:
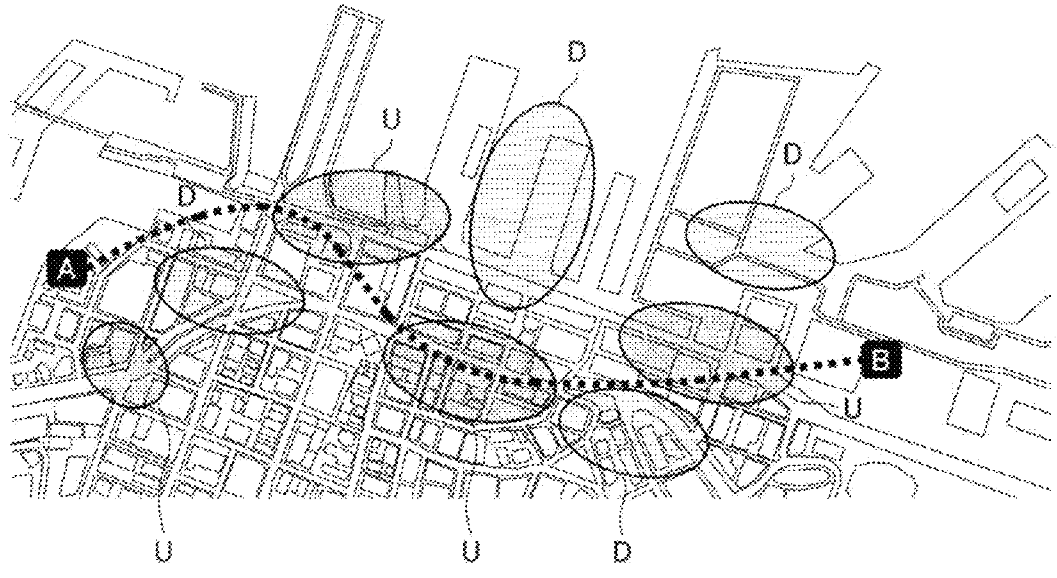
FIG. 6 is an explanatory diagram for explaining another example of the route on which the drone 5 moves.

FIG. 6 is an explanatory diagram for explaining another example of the route on which the drone 5 moves. In consideration of the environmental factors described above, for example, the drone 5 can more reduce the energy required for the movement between the point A and the point B when excluding the area of the downward air flow D from the flight route and flying preferentially in the area of the upward air flow U as illustrated in FIG. 6.

Thus, the server 10 according to the present disclosure generates route information capable of minimizing the energy required for the movement of the drone 5 by utilizing the environmental factors that affect the movement of the drone 5 as described above.

The outline of the environmental factors that affect the movement of the drone 5 has been described above. Next, an example functional configuration of the drone 5 will be described.

<1.3. Example Functional Configuration of Drone 5>

Figure 7:
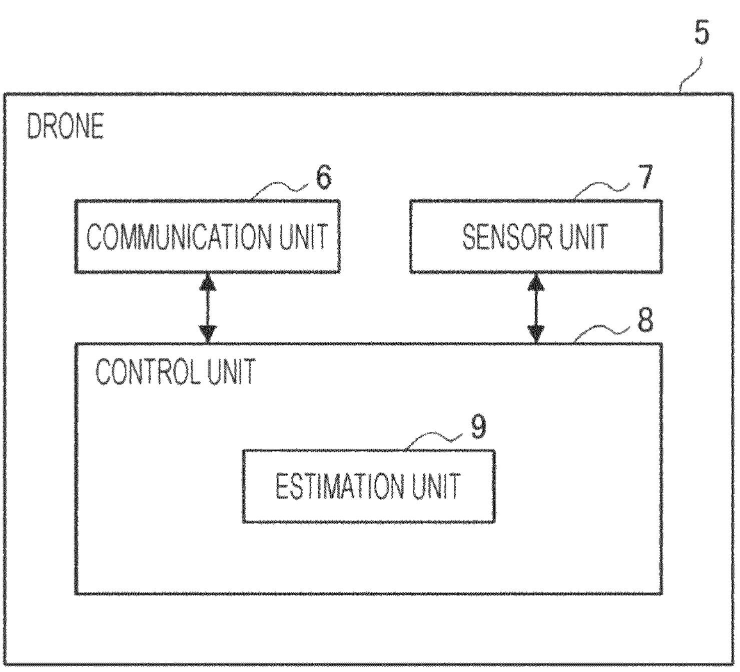
FIG. 7 is an explanatory diagram for explaining an example functional configuration of the drone 5 according to the present disclosure.

FIG. 7 is an explanatory diagram for explaining an example functional configuration of the drone 5 according to the present disclosure. As illustrated in FIG. 7, the drone 5 according to the present disclosure includes a communication unit 6, a sensor unit 7, and a control unit 8.

(Communication Unit 6)

The communication unit 6 according to the present disclosure performs various types of communication with the server 10. For example, the communication unit 6 transmits, to the server 10, information regarding a wind speed in the vertical direction (Hereinafter, the wind speed may be expressed to as a vertical wind speed.) estimated by an estimation unit 9. Furthermore, the communication unit 6 receives, from the server 10, route information indicating a route on which the drone 5 flies.

(Sensor Unit 7)

The sensor unit 7 according to the present disclosure includes a sensor that acquires various types of information on the drone 5 or various types of information on a surrounding environment of the drone 5.

For example, the sensor unit 7 includes sensors that respectively detect various types of information regarding an input value of a motor, an atmospheric pressure, positioning information, an acceleration, and an angular acceleration. Such various types of information detected by the sensor unit 7 may be expressed as sensing information.

(Control Unit 8)

The control unit 8 according to the present disclosure controls overall operation of the drone 5. The control unit 8 controls, for example, a moving direction and a speed of the drone 5. Furthermore, the control unit 8 moves the drone 5 on the basis of the route information received from the server 10.

Furthermore, as illustrated in FIG. 7, the control unit 8 according to the present disclosure includes the estimation unit 9.

The estimation unit 9 according to the present disclosure estimates, for example, the wind speed in the vertical direction with respect to the drone 5 as the environment information on the basis of the sensing information detected by the sensor unit 7.

The outline regarding the present disclosure has been described above. Next, an example functional configuration of the server 10 according to the present disclosure will be described with reference to FIG. 8.

2. Example Functional Configuration of Server 10

Figure 8:
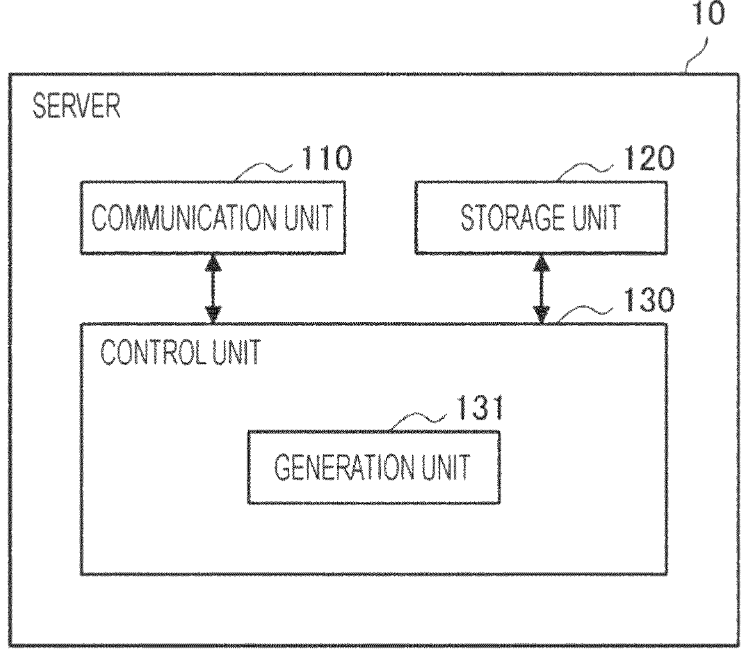
FIG. 8 is an explanatory diagram for explaining an example functional configuration of a server 10 according to the present disclosure.

FIG. 8 is an explanatory diagram for explaining the example functional configuration of the server 10 according to the present disclosure. As illustrated in FIG. 8, the server 10 according to the present disclosure includes a communication unit 110, a storage unit 120, and a control unit 130.

(Communication Unit 110)

The communication unit 110 according to the present disclosure performs various types of communication with the drone 5. For example, the communication unit 110 is an example of an acquisition unit, and receives, from the drone 5, the environment information estimated by the estimation unit 9 included in the drone 5.

For example, the communication unit 110 may receive, from the drone 5, environment information in each of regions on the route on which the drone 5 has flown.

Furthermore, the communication unit 110 may transmit, to the drone 5, the route information generated by a generation unit 131.

(Storage Unit 120)

The storage unit 120 according to the present disclosure holds software and various data. The storage unit 120 holds, for example, an environment map generated by the generation unit 131.

(Control Unit 130)

The control unit 130 according to the present disclosure controls overall operation of the server 10. As illustrated in FIG. 8, the control unit 130 includes the generation unit 131.

The generation unit 131 according to the present disclosure generates route information capable of minimizing the energy required for the movement of the drone 5 in the route between the first point and the second point set in advance on the basis of the environment information received from the drone 5.

For example, the generation unit 131 may generate the environment map on the basis of the environment information received from the drone 5. Then, the generation unit 131 may generate the route information on the basis of the generated environment map. A specific example regarding generation of the environment map will be described later.

The example functional configuration of the server 10 according to the present disclosure has been described above. Next, details regarding the present disclosure will be described with reference to FIGS. 9 to 15.

3. Details

Figure 9:
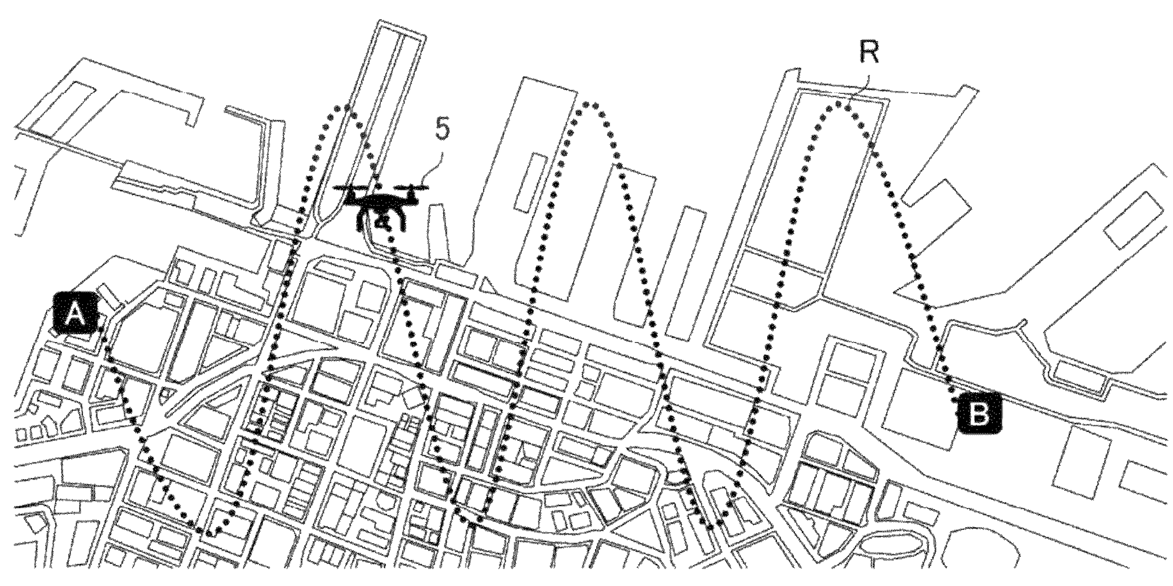
FIG. 9 is an explanatory diagram for explaining an example of a movement route on which the drone 5 acquires sensing information.

FIG. 9 is an explanatory diagram for explaining an example of a movement route on which the drone 5 acquires sensing information. The drone 5 moves while performing sensing by the sensor unit 7.

For example, the drone 5 moves while acquiring sensing information on a route R detouring between the point A and the point B as illustrated in FIG. 9. However, the route R illustrated in FIG. 9 illustrates a route in which the drone 5 moves from the point A to the point B while detouring, but the route of the drone 5 is not limited to such an example. For example, the route R may be a route in which the drone 5 linearly moves from the point A to the point B.

Furthermore, FIG. 9 illustrates an example in which there is one drone 5, but the number of drones 5 may be plural. Then, each of a plurality of the drones 5 may move while performing sensing in the route from the point A to the point B.

Figure 10:
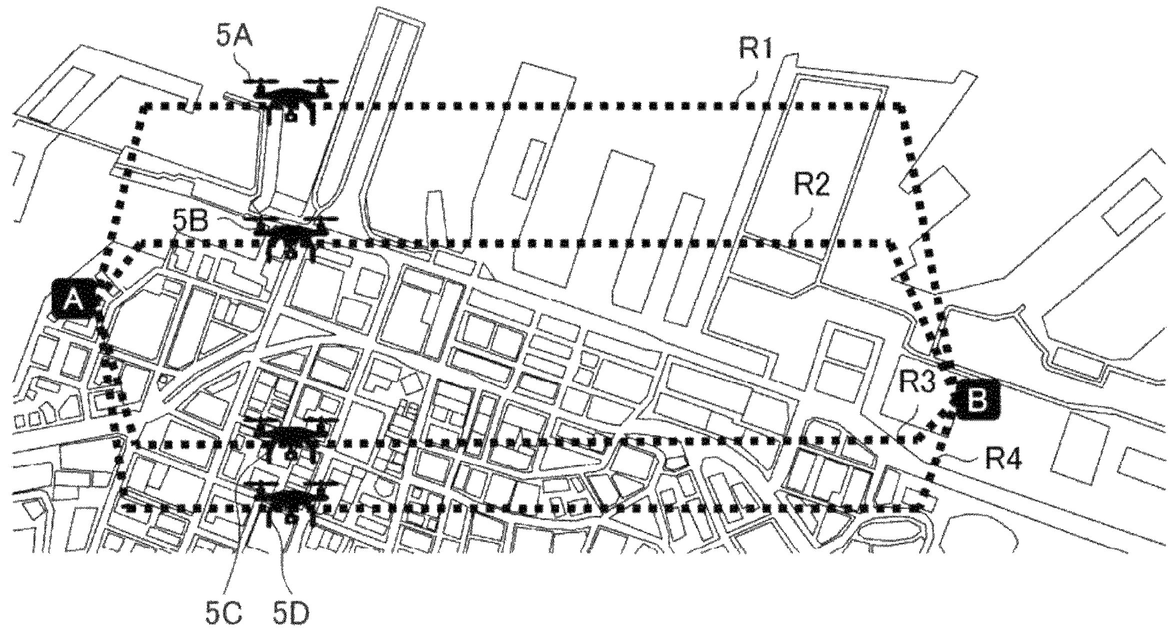
FIG. 10 is an explanatory diagram for explaining an example of movement routes on which a plurality of the drones 5 acquires sensing information.

FIG. 10 is an explanatory diagram for explaining an example of movement routes on which the plurality of drones 5 acquires sensing information. Although FIG. 10 illustrates an example in which there are four drones 5 of a drone 5A, a drone 5B, a drone 5C, and a drone 5D, the number of drones 5 may be two or three, or may be five or more.

For example, the drone 5A, the drone 5B, the drone 5C, and the drone 5D may move between the point A and the point B while acquiring the sensing information on respective different routes.

More specifically, the drone 5A may acquire the sensing information while moving on a route R1 as illustrated in FIG. 10. Furthermore, the drone 5B may acquire the sensing information while moving on a route R2 as illustrated in FIG. 10. Furthermore, the drone 5C may acquire the sensing information while moving on a route R3 as illustrated in FIG. 10. Furthermore, the drone 5D may acquire the sensing information while moving on a route R4 as illustrated in FIG. 10.

The plurality of drones 5 moves on the respective different routes in this manner, so that the server 10 can acquire the environment information based on the sensing information collected in a shorter time. Then, since the vertical wind speed may vary with a lapse of time, the server 10 can generate the environment map to be described later with higher accuracy on the basis of the environment information collected in a short time.

Furthermore, in FIG. 10, an example has been described in which the plurality of drones 5 moves on the respective different routes, but the plurality of drones 5 may move on the same route or partially overlapping routes. As a result, each of the plurality of drones 5 can estimate the vertical wind speed in the same region. Then, the server 10 can acquire a plurality of vertical wind speeds in the same region. A specific example will be described later of processing when the server 10 acquires the plurality of vertical wind speeds.

Then, the estimation unit 9 included in the drone 5 estimates the vertical wind speed as the environment information that affects the movement of the drone 5 on the basis of the acquired sensing information. Then, the drone 5 transmits the estimated vertical wind speed to the server 10.

Then, on the basis of the environment information acquired from the drone 5, in a route between points set in advance for a certain drone 5, the server 10 generates route information capable of minimizing the energy required for the movement of the drone 5. Hereinafter, detailed descriptions will be sequentially given of processing from acquisition of the environment information by the server 10 to generation of the route information by the server 10.

<3.1. Generation of Environment Map>

Figures 11, 12:
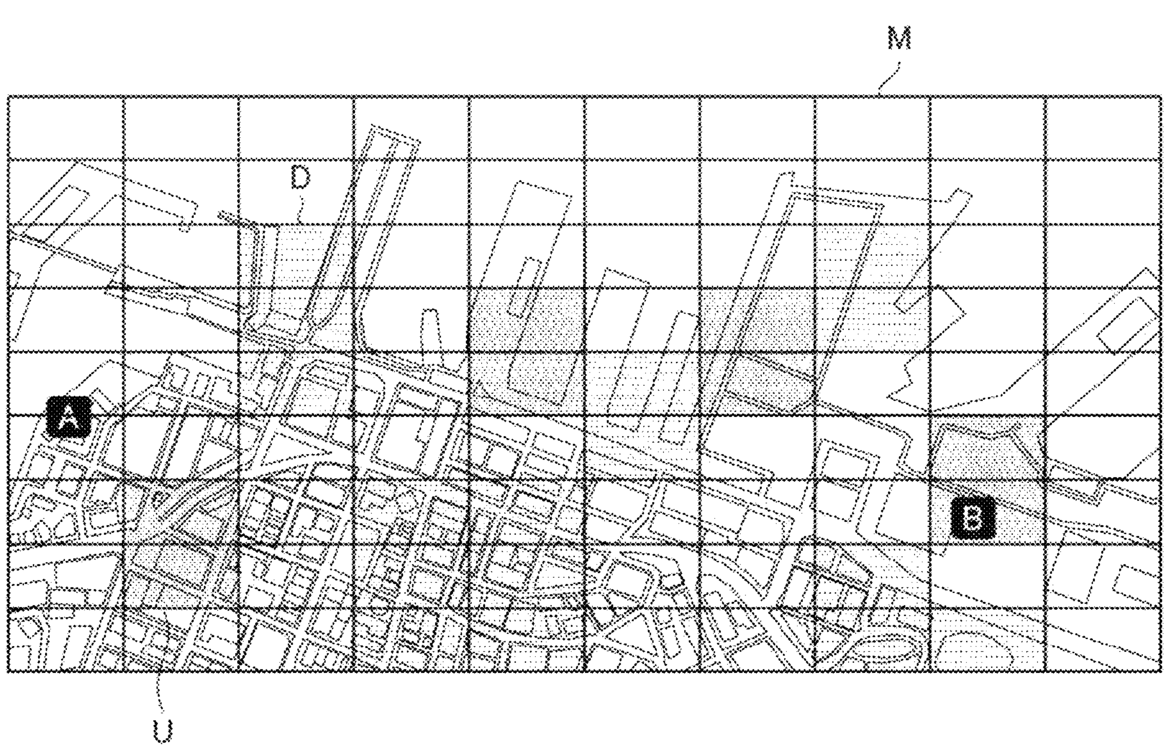
FIG. 11 is an explanatory diagram for explaining an example of an environment map according to the present disclosure.
FIG. 12 is an explanatory diagram for explaining details of the environment map according to the present disclosure.

FIG. 11 is an explanatory diagram for explaining an example of an environment map according to the present disclosure. For example, the generation unit 131 according to the present disclosure generates an environment map M as illustrated in FIG. 11 on the basis of the vertical wind speed received from the drone 5.

For example, the generation unit 131 may receive the environment information received from the drone 5, and position information on the drone 5 when the sensing information used for estimating the environment information is acquired in association with each other. Then, on the basis of the position information, the generation unit 131 may specify which region of a plurality of regions as illustrated in FIG. 11 the received environment information is about.

Then, on the basis of the environment information in each region, the generation unit 131 may generate the environment map M regarding magnitude of the energy required for the movement of the drone 5 in a plurality of regions including each region.

For example, the plurality of regions included in the environment map M includes a region having the upward air flow U, a region having the downward air flow D, or another region (region without hatching illustrated in FIG. 11). Here, the other region includes a region that has neither the upward air flow nor the downward air flow, a region where the drone 5 has not detected sensing information (that is, a region where the drone 5 has not moved), and a region where the sensing information has been inaccurate although the drone 5 has moved.

FIG. 12 is an explanatory diagram for explaining details of the environment map according to the present disclosure. For example, the generation unit 131 generates the environment map M by using the vertical wind speed included in the environment information.

Here, a case where the vertical wind speed has a positive value is the upward air flow, and a case where the vertical wind speed has a negative value is the downward air flow. Furthermore, in the other region, the vertical wind speed is 0.

Furthermore, in the region having the upward air flow, the energy required for the movement of the drone 5 can be smaller when the drone 5 moves in a region where the value of the vertical wind speed is larger. For example, compared with a region where the vertical wind speed is "+8", the drone 5 can receive influence in a direction in which the movement of the drone 5 is propelled more when moving in a region where the vertical wind speed is "+10".

Furthermore, in a region having the downward air flow, the drone 5 moves in a region where the value of the vertical wind speed is smaller, whereby the energy required for the movement of the drone 5 can be larger. For example, compared with a region where the vertical wind speed is "−1", the drone 5 can receive influence in a direction in which the movement of the drone 5 is hindered more when moving in a region where the vertical wind speed is "−2".

As described above, a degree of affecting the movement of the drone 5 varies depending on the magnitude of the value of the vertical wind speed, in the upward air flow or the downward air flow.

Furthermore, in a case where there is the plurality of drones 5 according to the present disclosure, the communication unit 110 may receive environment information including the vertical wind speed in regions on each route on which a corresponding one of the plurality of drones 5 has flown.

Then, in a case where a plurality of vertical wind speeds is acquired in the same region among the regions of each route on which a corresponding one of the plurality of drones 5 has flown, the generation unit 131 may execute statistical processing on the plurality of vertical wind speeds.

For example, the generation unit 131 may execute averaging processing as the statistical processing on the plurality of vertical wind speeds acquired in the same region.

More specifically, the communication unit 110 receives, from the drone 5, environment information including a fact that the vertical wind speed is "+6" in a certain region. Furthermore, the communication unit 110 receives, from the drone 5, environment information including a fact that the vertical wind speed is "+4" in the same region.

In this case, for example, generation unit 131 may execute the averaging processing as the statistical processing on the two vertical wind speeds acquired in the same region, and estimate that the vertical wind speed in the region is "+5".

Furthermore, the vertical wind speed may vary depending on the altitude at which the drone 5 flies. Thus, the drone 5 may transmit, to the server 10, the vertical wind speed, and information regarding the altitude of the drone 5 when the sensing information used for estimating the vertical wind speed is acquired in association with each other.

Then, the generation unit 131 may generate environment maps for a plurality of altitudes including the altitude of the route on which the drone 5 has flown.

Figure 13:
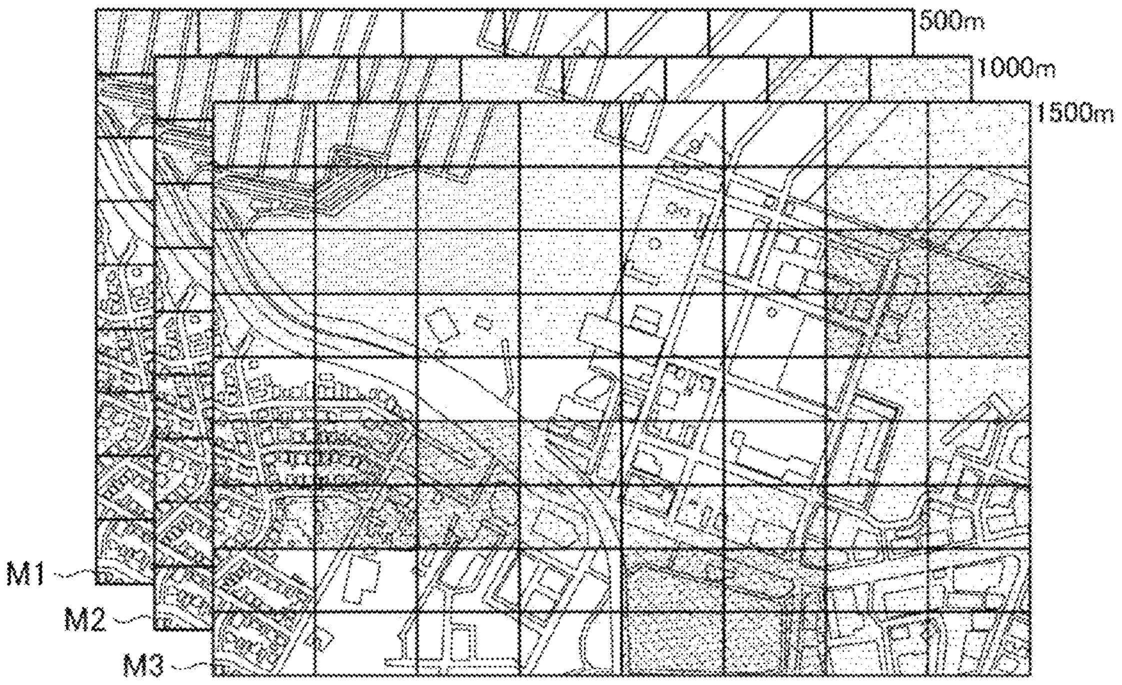
FIG. 13 is an explanatory diagram for explaining a specific example of environment maps generated at a plurality of altitudes.

FIG. 13 is an explanatory diagram for explaining a specific example of environment maps generated at a plurality of altitudes. For example, the communication unit 110 receives the vertical wind speed in each region at an altitude of 500 m from the drone 5 that has flown on the route at the altitude of 500 m. Then, the generation unit 131 may generate an environment map M1 at the altitude of 500 m on the basis of the vertical wind speed at the altitude of 500 m.

Furthermore, the communication unit 110 receives the vertical wind speed in each region at an altitude of 1000 m from the drone 5 that has flown on the route at the altitude of 1000 m. Then, the generation unit 131 may generate an environment map M2 at the altitude of 1000 m on the basis of the vertical wind speed at the altitude of 1000 m.

Furthermore, the communication unit 110 receives the vertical wind speed in each region at an altitude of 1500 m from the drone 5 that has flown on the route at the altitude of 1500 m. Then, the generation unit 131 may generate an environment map M3 at the altitude of 1500 m on the basis of the vertical wind speed at the altitude of 1500 m.

Note that the plurality of altitudes may have a range of a constant value around each altitude. For example, the environment map M1 at the altitude of 500 m may be an environment map at an altitude of 500±250 m.

As described above, by applying the vertical wind speed that can vary depending on the altitude to the environment map, the generation unit 131 can generate an efficient movement route of the drone 5 with higher accuracy even in a case where a flight altitude of the drone 5 is over a wide range.

The details regarding the generation of the environment map according to the present disclosure have been described above. The generation unit 131 generates the environment map by the processing as described above and stores the environment map in the storage unit 120.

Then, the generation unit 131 generates route information used for the movement of the drone 5 on the basis of the environment map held in the storage unit 120. Next, details of the route information generated by the generation unit 131 will be described.

<3.2. Generation of Route Information>

As described above, the generation unit 131 according to the present disclosure generates route information capable of minimizing the energy required for the movement of the drone 5 in the route between the point A and the point B on the basis of the generated environment map.

For example, compared with a region where the vertical wind speed is small, a region where the vertical wind speed is large has an effect of reducing the energy required for the movement of the drone 5.

Furthermore, compared with a route with a long distance, a route with a short distance has an effect of reducing the energy required for the movement of the drone 5.

The generation unit 131 may combine such a plurality of factors for reducing the energy to generate route information capable of minimizing the energy required for the movement of the drone 5.

For example, the storage unit 120 may hold a relationship among the vertical wind speed, the distance, and the energy required by the drone 5. Then, the generation unit 131 may generate route information capable of minimizing the energy required for the movement of the drone 5 on the basis of the relationship held by the storage unit 120.

Furthermore, influence of the vertical wind speed may vary depending on characteristics such as a shape and weight of the drone 5. For example, as the surface of the drone 5 receiving the vertical wind speed is larger, the influence of the vertical wind speed can be greater. For example, as the surface of the drone 5 receiving the vertical wind speed is larger, a length of the distance may affect the magnitude of the energy required for the movement of the drone 5 as compared with the influence of the vertical wind speed.

Thus, the generation unit 131 may generate route information capable of minimizing the energy required for the movement of the drone 5 on the basis of the generated environment map and the characteristics of the drone 5.

Furthermore, an example has been mainly described in which the points set in advance are two points such as the point A and the point B, but the points set in advance may be three or more points. Then, the generation unit 131 may generate more efficient route information in each of routes for at least three or more points set in advance on the basis of the generated environment map.

Figure 14A:
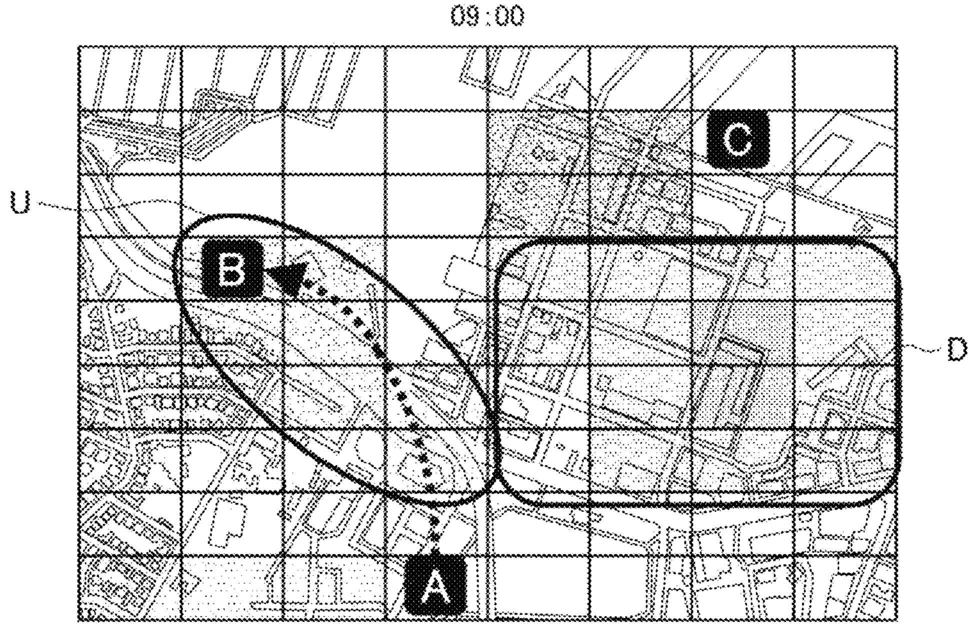
FIG. 14A is an explanatory diagram for explaining a specific example regarding generation of route information in a case where three points are set.
Figure 14B:
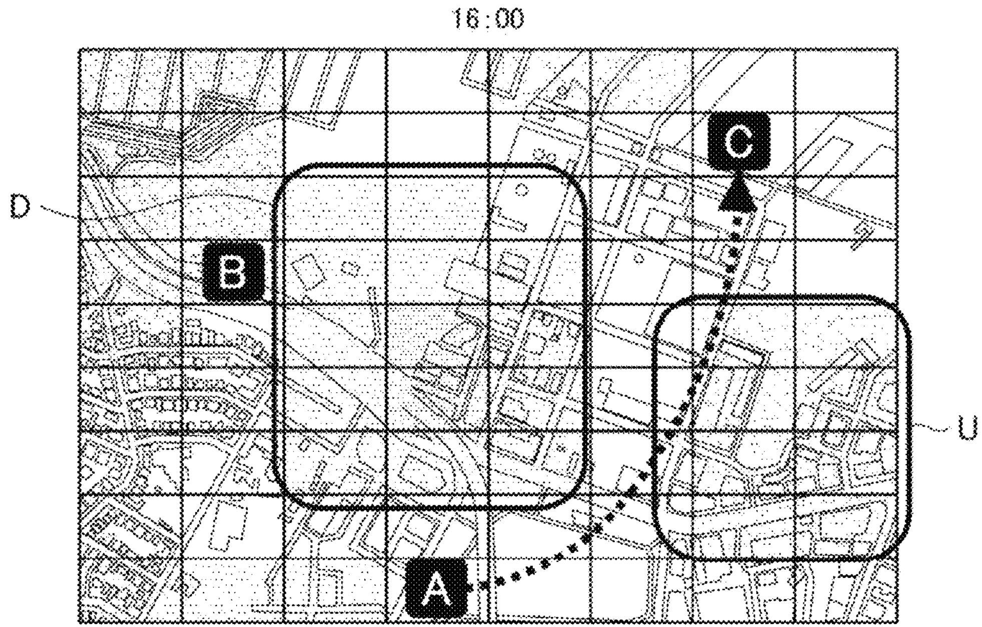
FIG. 14B is an explanatory diagram for explaining the specific example regarding generation of the route information in the case where the three points are set.

FIGS. 14A and 14B are explanatory diagrams for explaining a specific example regarding generation of route information in a case where three points are set. For example, the point A is set as a departure point, and the point B and a point C are set as arrival points.

For example, an example will be described in which the drone 5 departs from the point A at 9:00. In an environment map generated at 9:00 as illustrated in FIG. 14A, it is indicated that the downward air flow D is generated between the point A and the point C, and the upward air flow U is generated between the point A and the point B.

In this case, the generation unit 131 may avoid movement in a region where the downward air flow D is generated, and may generate efficient route information from the point A toward the point B instead of a route from the point A to the point C. More specifically, as illustrated in FIG. 14A, the generation unit 131 may generate route information on a route of the drone 5 from the point A to the point B and capable of minimizing the energy required for the movement of the drone 5.

Furthermore, an example will be described in which the drone 5 departs from the point A at 16:00. In an environment map generated at 16:00 as illustrated in FIG. 14B, it is indicated that the downward air flow D is generated between the point A and the point B, and the upward air flow U is generated between the point A and the point C.

In this case, the generation unit 131 may avoid movement in a region where the downward air flow D is generated, and may generate efficient route information from the point A toward the point C instead of a route from the point A toward the point B. More specifically, as illustrated in FIG. 14B, the generation unit 131 may generate route information on a route of the drone 5 from the point A to the point C and capable of minimizing the energy required for the movement of the drone 5.

As described above, the generation unit 131 may select a point heading from the point A earlier, of the point B or the point C, on the basis of the environment map generated at a time closest to a time when the drone 5 moves.

Furthermore, the drone 5 moves from the point A to the point B as illustrated in 14A, for example, on the basis of the route information generated by the generation unit 131. Then, the generation unit 131 may generate route information capable of minimizing the energy required for the movement of the drone 5 between the point B and the point C on the basis of the environment map.

Here, in a case where the downward air flow occurs between the point B and the point C at a time when the drone 5 departs from the point B, the generation unit 131 may generate information for stopping the movement of the drone 5 until the downward air flow settles in a route from the point B to the point C.

Furthermore, regarding the route information to be transmitted to the drone 5, for example, there may be two types, route information for the purpose of minimizing the energy required for the movement of the drone 5, and route information for the purpose of generation of the environment map.

Figure 15:
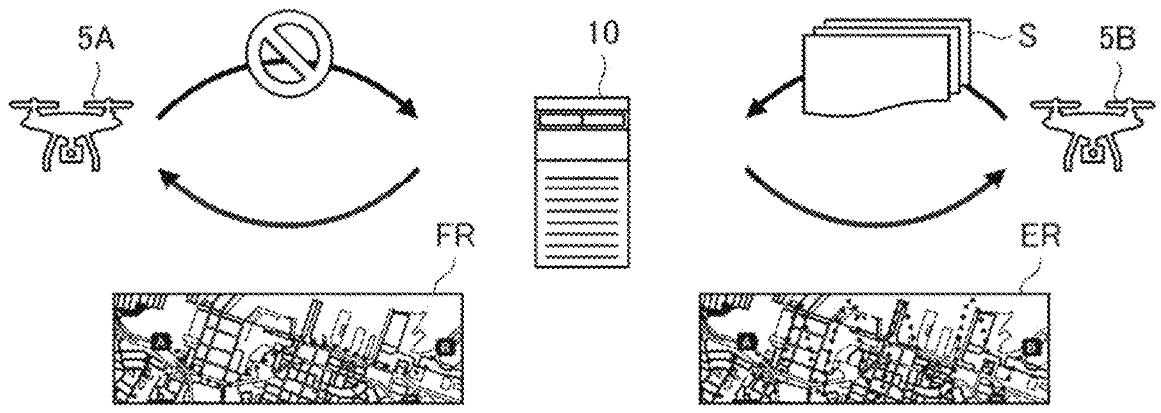
FIG. 15 is an explanatory diagram for explaining an example of route information to be transmitted to the drone 5.

FIG. 15 is an explanatory diagram for explaining an example of the route information to be transmitted to the drone 5. For example, the drone 5 may include two types of drones having different flight priorities.

The drone 5A having a high flight priority may be, for example, a drone to which more efficient route information is provided. For example, the generation unit 131 may generate, for the drone 5A having the high flight priority, route information FR capable of minimizing energy required for movement of the drone 5A in the route between the first point and the second point set in advance in the drone 5A, on the basis of the environment map held in the storage unit 120.

Furthermore, the drone 5B having a low flight priority may be, for example, a drone for the purpose of information collection for generation of the environment map. For example, the generation unit 131 may generate, for the drone 5B having the low flight priority, other route information ER for collecting environment information in a plurality of regions. Then, the server 10 may transmit the generated other route information ER to the drone 5B having the low flight priority. Note that the other route information ER for collecting the environment information in the plurality of regions includes, for example, a detour route that connects two points to each other as illustrated in FIG. 15.

Furthermore, there is a case where the drone 5A having the high flight priority flies at a higher moving speed. As the moving speed increases, reliability of the sensing information may be reduced. Thus, the drone 5A having the high flight priority does not have to transmit, to the server 10, the environment information including the vertical wind speed based on the sensing information.

On the other hand, since the drone 5B having a high flight degree is a drone for the purpose of information collection, the moving speed may be lower than that of the drone 5A having the high flight priority. Thus, the drone 5B having the high flight degree may transmit, to the server 10, environment information S including the vertical wind speed based on the sensing information.

Then, the server 10 may receive the environment information only from the drone 5B having the low flight priority instead of the drone 5A having the high flight priority.

The details of the route information generated by the generation unit 131 have been described above. Next, details regarding update of the environment map will be described.

<3.3. Update of Environment Map>

The generation unit 131 may update an existing environment map held in the storage unit 120 by using a newly generated environment map.

For example, the generation unit 131 may update the environment map on the basis of a new environment map indicating the newly generated environment map and a past environment map indicating the existing environment map generated in the past.

For example, the generation unit 131 may perform update by setting, as the vertical wind speed in each of regions, an average value of the vertical wind speed in each of regions of the past environment map and the vertical wind speed in each of regions of the new environment map corresponding to each of regions of the past environment map.

At this time, for the plurality of regions included in the new environment map or the past environment map, the vertical wind speed may not be obtained in all the regions. In this case, the generation unit 131 may update the environment map by setting the average value of the past environment map and the new environment map as the vertical wind speed in each region only in a region where the vertical wind speed is obtained in both maps.

Furthermore, the generation unit 131 may update the environment map by setting the average value of the past environment map and the new environment map as the vertical wind speed in each region, assuming that the wind speed is 0 in the region where the vertical wind speed is not obtained.

Furthermore, the generation unit 131 may update the environment map by weighted averaging using weight parameters, of the vertical wind speed in each region of the past environment map and the vertical wind speed in each region of the new environment map corresponding to each region of the past environment map.

For example, a weight parameter of the new environment map is set as X, and a weight parameter of the past environment map is set as Y. For example, the weight parameters X and Y may be varied depending on an environment of acquisition of the sensing information used for estimation of the vertical wind speed.

For example, the weight parameters may be varied depending on a factor related to air stability, such as a place (for example, a city, a mountain, a sea, or the like) indicated by the environment map or a season (summer, spring, or the like).

Furthermore, the weight parameters may be varied depending on the speed of the drone 5 at the time of sensing or performance of the sensor of the drone 5.

More specifically, in a case where the speed of the drone 5 that has acquired the sensing information used for generation of the new environment map is faster than the speed of the drone 5 that has acquired the sensing information used for generation of the past environment map, sensing accuracy used for generation of the new environment map may be reduced. In such a case, the weight parameter X of the new environment map may be set smaller than the weight parameter Y of the past environment map.

Furthermore, in the case of an environment map of a place or a season in which air stability is poor, the new environment map may be more reliable than the past environment map. In such a case, the weight parameter X of the new environment map may be set larger than the weight parameter Y of the past environment map.

Furthermore, the generation unit 131 may execute attenuation processing on the vertical wind speed in a region where a predetermined time has elapsed or the vertical wind speed for which the statistical processing described above has been executed among the plurality of regions included in the environment map.

The generation unit 131 may execute the attenuation processing on, for example, the vertical wind speed in a region where update has not been performed for three hours. The attenuation processing here is, for example, processing of multiplying the vertical wind speed in a non-updated region by an attenuation coefficient R ($0 \leq R < 1$).

Note that, even after the attenuation processing is executed, the generation unit 131 may execute the attenuation processing again every three hours with respect to the vertical wind speed in the non-updated region.

Furthermore, the generation unit 131 may update the vertical wind speed in each region of the past environment map by overwriting, with the vertical wind speed in the new environment map as newer information. At this time, the vertical wind speed in the past environment map may be applied to a region where the vertical wind speed is not obtained in the new environment map.

Then, the generation unit 131 may generate route information capable of minimizing the energy required for the movement of the drone 5 on the basis of the updated latest environment map.

The details regarding the present disclosure have been described above. Next, with reference to FIGS. 16 and 17, a specific example will be described of operation processing by the server 10 according to the present disclosure.

4. Example of Operation Processing

<4.1. Generation of Environment Map>

Figure 16:
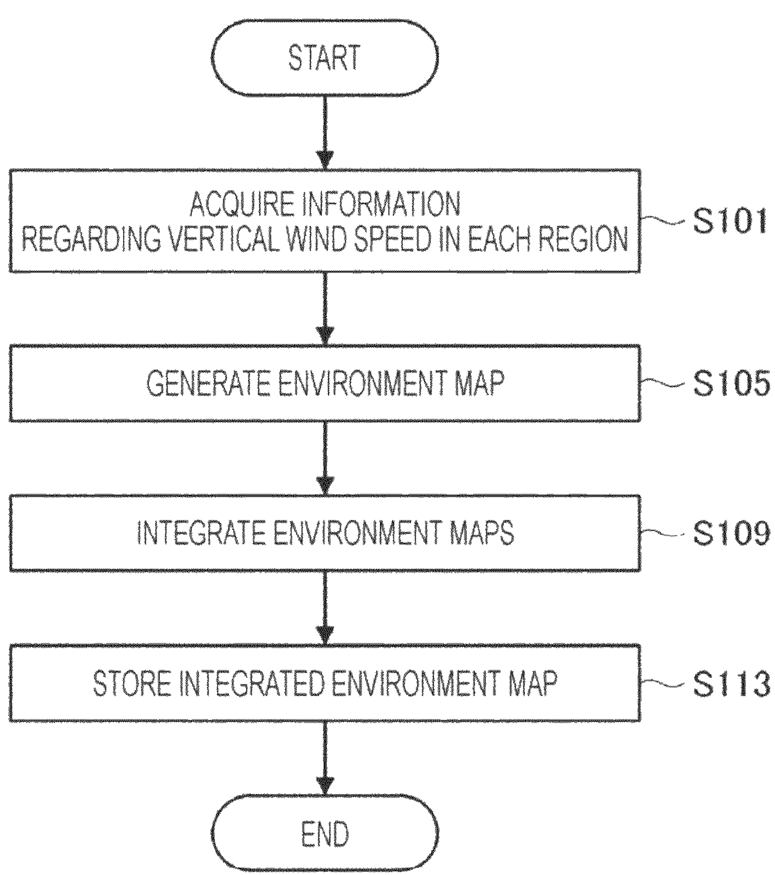
FIG. 16 is an explanatory diagram for explaining an example of operation processing regarding generation of an environment map by the server 10 according to the present disclosure.

FIG. 16 is an explanatory diagram for explaining an example of operation processing regarding generation of an environment map by the server 10 according to the present disclosure. First, the communication unit 110 receives the environment information regarding the vertical wind speed in each region (S101).

Next, the generation unit 131 generates an environment map regarding the magnitude of energy required for the movement of the drone 5 in a plurality of regions including each region on the basis of the received environment information (S105).

Then, the generation unit 131 integrates the generated environment map and the environment map held in the storage unit 120 (S109).

Then, the storage unit 120 stores an integrated environment map, and the server 10 according to the present disclosure ends the operation processing.

<4.2. Generation of Route Information>

Figure 17:
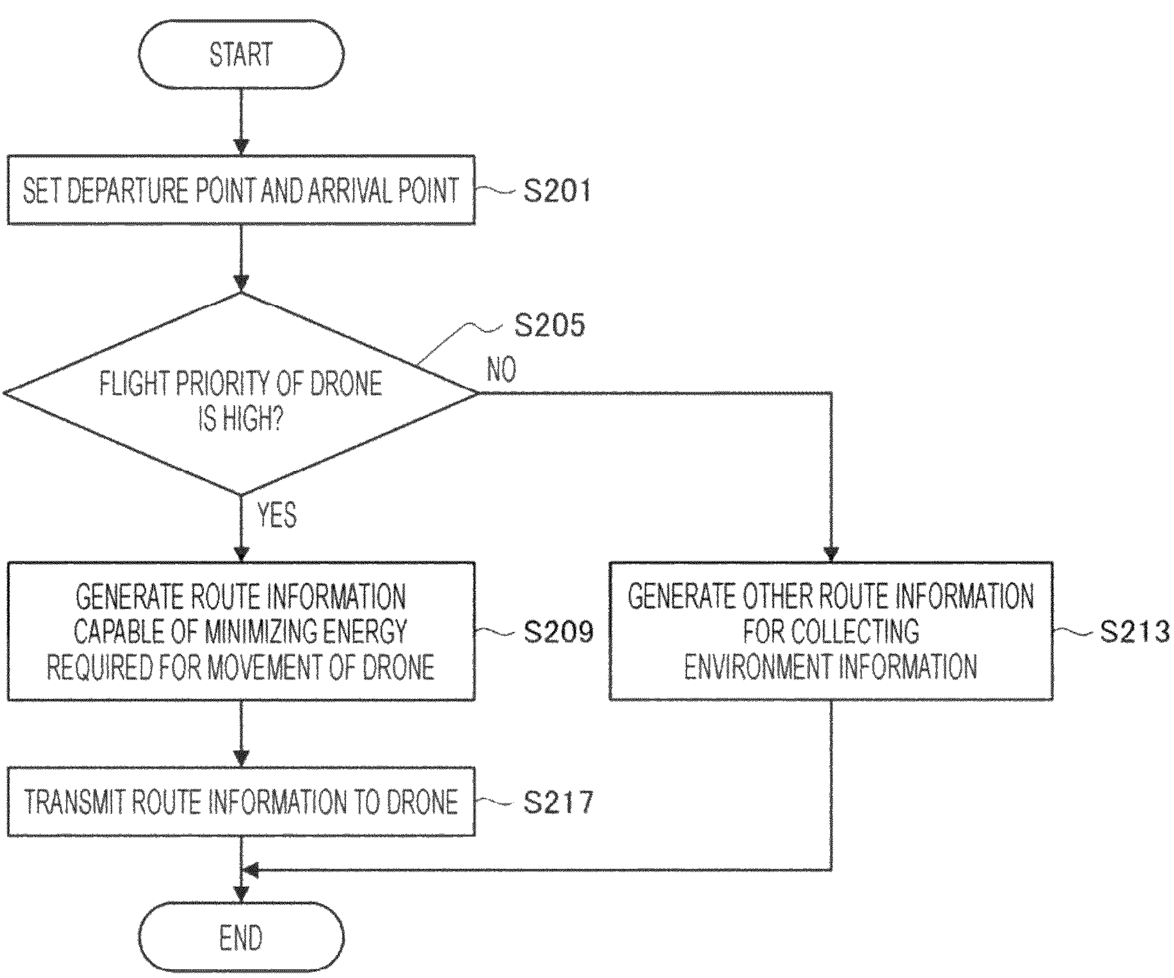
FIG. 17 is an explanatory diagram for explaining an example of the operation processing regarding the generation of the environment map by the server 10 according to the present disclosure.

FIG. 17 is an explanatory diagram for explaining an example of the operation processing regarding the generation of the environment map by the server 10 according to the present disclosure. First, a departure point and an arrival point are set by predetermined operation (S201). Note that the departure point and the arrival point of the drone 5 may be set by, for example, user's operation, or the drone 5 may set the departure point and the arrival point when a purpose is input.

Next, the control unit 130 determines whether or not the flight priority of the drone 5 is high (S205). In a case where it is determined that the flight priority of the drone 5 is high (S205/Yes), the processing proceeds to S209, and in a case where it is determined that the flight priority of the drone 5 is low (S205/No), the processing proceeds to S213.

In a case where it is determined that the flight priority of the drone 5 is high (S205/Yes), the generation unit 131 generates route information capable of minimizing the energy required for the movement of the drone 5 in a route between the set departure point and the arrival point (S209).

In a case where it is determined that the flight priority of the drone 5 is low (S205/No), the generation unit 131 generates other route information for collecting the environment information in the route between the set departure point and the arrival point (S213).

Then, the communication unit 110 transmits the generated route information to the drone 5 (S217), and the server 10 according to the present disclosure ends the operation processing.

The specific example of the operation processing by the server 10 according to the present disclosure has been described above. Next, a specific example will be described of functions and effects of the server 10 according to the present disclosure.

5. Example of Functions and Effects

According to the present disclosure described above, it is possible to obtain various functions and effects. For example, the generation unit 131 according to the present disclosure generates route information capable of minimizing the energy required for the movement of the drone 5 in the route between the first point and the second point set in advance on the basis of the environment information acquired from the drone 5. As a result, the drone 5 can move on the basis of more efficient route information generated in consideration of environmental factors that adversely affect the movement of the drone 5 and environmental factors that favorably affect the movement of the drone 5.

Furthermore, the communication unit 110 receives, from the plurality of drones 5, pieces of the environment information in the respective regions on each route on which a corresponding one of the plurality of drones 5 has flown. In a case where the plurality of drones 5 respectively flies on different routes, the communication unit 110 can receive environment information collected in a short time, and can reduce influence of an error in the vertical wind speed that can occur due to a time shift. Furthermore, in a case where the plurality of drones 5 flies on the same or partially overlapping route, the communication unit 110 can receive a plurality of pieces of environment information in the same region. As a result, the generation unit 131 can generate the environment map by using the plurality of pieces of environment information for one region, and can improve reliability of the vertical wind speed in each region of the environment map.

Furthermore, the generation unit 131 updates the environment map by integrating the past environment map and the new environment map. As a result, the generation unit 131 can reduce the influence of the error in the vertical wind speed that may occur in a case where the vertical wind speed is generated on the basis of the sensing information for one time, and can improve reliability of the value of the vertical wind speed in each region.

Furthermore, the plurality of drones 5 includes two types of drones 5 having different flight priorities. Therefore, the generation unit 131 can change the route information to be generated depending on the type. As a result, the generation unit 131 provides more efficient route information to the drone 5 having the high flight priority, and provides a route for the purpose of collecting sensing information used for generation or update of the environment map to the drone 5 having the low flight priority. Therefore, the generation unit 131 can generate the environment map with higher accuracy, and furthermore, the drone 5 can move with the route information generated in consideration of a situation.

6. Hardware Configuration Example

The embodiment of the present disclosure has been described above. Various types of information processing described above are implemented by cooperation of software and hardware of the server 10 described below. Note that a hardware configuration described below is also applicable to the drone 5.

FIG. 18 is a block diagram illustrating a hardware configuration of the server 10 according to the present disclosure. The server 10 includes a central processing unit (CPU) 1001, a read only memory (ROM) 1002, a random access memory (RAN) 1003, a host bus 1004, a bridge 1005, an external bus 1006, an interface 1007, an input apparatus 1008, an output apparatus 1010, a storage apparatus (HDD) 1011, a drive 1012, and a communication apparatus 1015.

The CPU 1001 functions as an arithmetic processing apparatus and a control apparatus, and controls overall operation in the server 10 in accordance with various programs. Furthermore, the CPU 1001 may be a microprocessor. The ROM 1002 stores programs, operation parameters, and the like that are used by the CPU 1001. The RAM 1003 temporarily stores the programs used in execution by the CPU 1001, parameters that change as appropriate in the execution, and the like. They are connected to each other by the host bus 1004 including a CPU bus and the like. Functions can be implemented of the generation unit 131 and the like described with reference to FIG. 8 by cooperation of the CPU 1001, the ROM 1002, the RAM 1003, and the software.

The host bus 1004 is connected to the external bus 1006 such as a peripheral component interconnect/interface (PCI) bus via the bridge 1005. Note that the host bus 1004, the bridge 1005, and the external bus 1006 are not necessarily configured separately, and functions thereof may be mounted on one bus.

The input apparatus 1008 include, for example, an input means that allows a user to input information, such as a mouse, a keyboard, a touch panel, a button, a microphone, a switch, and a lever, and an input control circuit that generates an input signal on the basis of an input by the user and outputs the input signal to the CPU 1001. By operating the input apparatus 1008, the user of the server 10 can input various data to the server 10 and gives an instruction to perform processing operation.

For example, the output apparatus 1010 includes display apparatuses such as a liquid crystal display apparatus, an OLED apparatus, and a lamp. Moreover, the output apparatus 1010 includes audio output apparatuses such as a speaker and headphones. The output apparatus 1010 outputs, for example, a reproduced content. Specifically, the display apparatus displays various types of information such as reproduced video data as text or images. On the other hand, the audio output apparatuses convert reproduced audio data and the like into audio and outputs the audio.

The storage apparatus 1011 is an apparatus for data storage. The storage apparatus 1011 may include, for example, a storage medium, a recording apparatus that records data in the storage medium, a reading apparatus that reads data from the storage medium, and a deletion apparatus that deletes data recorded on the storage medium. For example, the storage apparatus 1011 includes a hard disk drive (HDD). The storage apparatus 1011 drives a hard disk and stores programs to be executed by the CPU 1001 and various data.

The drive 1012 is a reader/writer for the storage medium, and is built in or externally attached to the server 10. The drive 1012 reads information recorded in a removable storage medium 15 mounted thereon, such as a magnetic disk, an optical disk, a magneto-optical disk, or a semiconductor memory, and outputs the information to the RAM 1003. Furthermore, the drive 1012 can also write information to the removable storage medium 15.

The communication apparatus 1015 is, for example, a communication interface including a communication device or the like for connection to the network 1. Furthermore, the communication apparatus 1015 may be a wireless LAN compatible communication apparatus, a long term evolution (LTE) compatible communication apparatus, or a wire communication apparatus that performs wired communication.

7. Supplement

The preferred embodiment of the present disclosure has been described in detail above with reference to the accompanying drawings, but the present disclosure is not limited to such an example. It is apparent that a person having ordinary knowledge in the technical field to which the present disclosure belongs can devise various change examples or modification examples within the scope of the technical idea described in the claims, and it will be naturally understood that such examples also belong to the technical scope of the present disclosure.

For example, in the present specification, an example has been mainly described in which the server 10 is an information processing apparatus, but the function of the information processing apparatus may be implemented by the drone 5. In this case, the drone 5 may further include the generation unit 131.

Furthermore, in the present specification, although an example has been described in which the vertical wind speed is estimated by the drone 5, the server 10 may further include an estimation unit, and the vertical wind speed may be estimated on the server 10. In this case, the drone 5 may transmit various types of sensing information acquired by the sensor unit 7 to the server 10, and the server 10 may estimate the vertical wind speed on the basis of the received sensing information.

Furthermore, in the present specification, an example has been mainly described in which the mobile object is the drone 5, but the mobile object is not limited to such an example. For example, the mobile object may be a ship. Furthermore, the environment information is not limited to the vertical wind speed. For example, in a case where the mobile object is a ship, the environment information may be a wave height.

Furthermore, the environment information that affects the movement of the drone 5 is not limited to the vertical wind speed. For example, the environment information that affects the movement of the drone 5 may be a wind speed in the horizontal direction or various types of information such as weather and climate stability.

Furthermore, in the present specification, an example has been mainly described in which the generation unit 131 generates the environment map from the information regarding the vertical wind speed received from the drone 5 and generates the route information of the drone 5 on the basis of the generated environment map, but the generation unit 131 does not necessarily have to generate the environment map. For example, the generation unit 131 receives the information regarding the vertical wind speed received from the drone 5 and the position information on the drone 5 when the drone 5 performs sensing. Then, for example, the generation unit 131 may generate route information for preferentially moving a region within a predetermined range from a position where the vertical wind speed is estimated to be greater than or equal to a predetermined value.

Furthermore, steps in the processing by the server 10 in the present specification do not necessarily have to be processed in a time series in an order described as a flowchart. For example, the steps in the processing by the server 10 may be processed in an order different from the order described in the flowchart, or may be processed in parallel.

Furthermore, it is also possible to create a computer program for causing the hardware such as the CPU, ROM, and RAM built in the server 10 and the drone 5 to exhibit functions equivalent to the components of the server 10 and the drone 5 described above. Furthermore, a storage medium storing the computer program is also provided.

Furthermore, the effects described in the present specification are merely exemplary or illustrative, and not restrictive. That is, the technology according to the present disclosure can exhibit other effects apparent to those skilled in the art from the description of the present specification, in addition to the effects described above or instead of the effects described above.

Note that the following configurations also belong to the technical scope of the present disclosure.

(1)

An information processing apparatus including:

an acquisition unit that acquires, from a mobile object, environment information that affects movement of the mobile object; and a generation unit that generates route information capable of minimizing energy required for the movement of the mobile object in a route between a first point and a second point set in advance on the basis of the environment information.

(2)

The information processing apparatus according to (1), in which the mobile object is a flying object, and the acquisition unit acquires, from the flying object, environment information that affects flight of the flying object in each of regions of a route on which the flying object has flown.

(3)

The information processing apparatus according to (2), in which the generation unit, on the basis of the environment information in each of the regions acquired by the acquisition unit, generates an environment map regarding magnitude of energy required for movement of the flying object in a plurality of regions including the each of the regions, and generates the route information on the basis of the environment map.

(4)

The information processing apparatus according to (3), in which the acquisition unit acquires, from a plurality of flying objects, pieces of the environment information in respective regions on each of routes on which a corresponding one of the plurality of flying objects has flown.

(5)

The information processing apparatus according to (4), in which the generation unit executes statistical processing on a plurality of pieces of environment information when the plurality of pieces of environment information is acquired in the same region, and the generation unit generates the environment map on the basis of the plurality of pieces of environment information on which the statistical processing is executed.

(6)

The information processing apparatus according to (5), in which the generation unit executes attenuation processing on the environment information in a region where a predetermined time has elapsed among a plurality of regions included in the environment map, or the environment information on which the statistical processing is executed, and generates the route information on the basis of the environment map on which the attenuation processing is executed.

(7)

The information processing apparatus according to any one of (4) to (6), in which the environment information includes information regarding an altitude of a route on which the flying object has flown, and the generation unit generates the environment map for a plurality of altitudes including the altitude of the route on which the flying object has flown.

(8)

The information processing apparatus according to any one of (4) to (7), in which the generation unit updates an environment map on the basis of a new environment map indicating a newly generated environment map and a past environment map indicating an existing environment map generated previously, and generates the route information on the basis of an updated environment map.

(9)

The information processing apparatus according to (8), in which the generation unit executes weighted averaging on the new environment map and the past environment map, and update the environment map.

(10)

The information processing apparatus according to any one of (4) to (9), in which the plurality of flying objects includes two types of mobile objects having different flight priorities, and the generation unit generates the route information for a flying object having a high flight priority, and generates other route information for collecting the environment information in the plurality of regions for a flying object having a low flight priority.

(11)

The information processing apparatus according to (10), in which the acquisition unit acquires the environment information from the flying object having the low flight priority.

(12)

The information processing apparatus according to any one of (3) to (11), in which the generation unit generates route information capable of minimizing energy required for the movement of the mobile object in each of routes for at least three or more points set in advance on the basis of the environment map.

(13)

The information processing apparatus according to any one of (1) to (12), in which the environment information includes a wind speed in a vertical direction with respect to the flying object.

(14)

An information processing method executed by a computer, including:

acquiring, from a mobile object, environment information that affects movement of the mobile object; and generating route information capable of minimizing energy required for the movement of the mobile object in a route between a first point and a second point set in advance on the basis of the environment information.

(15)

A program causing a computer to implement:

an acquisition function of acquiring, from a mobile object, environment information that affects movement of the mobile object; and a generation function of generating route information capable of minimizing energy required for the movement of the mobile object in a route between a first point and a second point set in advance on the basis of the environment information.

REFERENCE SIGNS LIST

1 Network
5 Drone
6 Communication unit
7 Sensor unit
8 Control unit
9 Estimation unit
10 Server
110 Communication unit
120 Storage unit
130 Control unit
131 Generation unit

The invention claimed is:

1. An information processing apparatus comprising:

circuitry configured to acquire, from a mobile object, environment information that affects movement of the mobile object, generate route information that minimizes energy required for the movement of the mobile object in a route between a first point and a second point set in advance based on the environment information, wherein the route excludes areas having a downward air flow and includes areas having an upward air flow, and transmit the route information to the mobile object to cause the mobile object to move along the route.

2. The information processing apparatus according to claim 1, wherein the mobile object is a flying object, and the circuitry is further configured to acquire, from the flying object, environment information that affects flight of the flying object in each of regions of a route on which the flying object has flown.

3. The information processing apparatus according to claim 2, wherein the circuitry is further configured to based on the environment information in each of the regions, generate an environment map regarding magnitude of energy required for movement of the flying object in a plurality of regions including the each of the regions, and generate the route information based on the environment map.

4. The information processing apparatus according to claim 3, wherein the circuitry is further configured to acquire, from a plurality of flying objects, pieces of the environment information in respective regions on each of routes on which a corresponding one of the plurality of flying objects has flown.

5. The information processing apparatus according to claim 4, wherein the circuitry is further configured to execute statistical processing on a plurality of pieces of environment information when the plurality of pieces of environment information is acquired in a same region, and generate the environment map based on the plurality of pieces of environment information on which the statistical processing is executed.

6. The information processing apparatus according to claim 5, wherein the circuitry is further configured to execute attenuation processing on the environment information in a region where a predetermined time has elapsed among a plurality of regions included in the environment map, or the environment information on which the statistical processing is executed, and generate the route information based on the environment map on which the attenuation processing is executed.

7. The information processing apparatus according to claim 6, wherein the environment information includes information regarding an altitude of a route on which the flying object has flown, and the circuitry is further configured to generate the environment map for a plurality of altitudes including the altitude of the route on which the flying object has flown.

8. The information processing apparatus according to claim 7, wherein the circuitry is further configured to update an environment map based on a new environment map indicating a newly generated environment map and a past environment map indicating an existing environment map generated previously, and generate the route information based on an updated environment map.

9. The information processing apparatus according to claim 8, wherein the circuitry is further configured to execute weighted averaging on the new environment map and the past environment map, and update the environment map.

10. The information processing apparatus according to claim 9, wherein the plurality of flying objects includes two types of mobile objects having different flight priorities, and the circuitry is further configured to generate the route information for a flying object having a high flight priority, and generate other route information for collecting the environment information in the plurality of regions for a flying object having a low flight priority.

11. The information processing apparatus according to claim 10, wherein the circuitry is further configured to acquire the environment information from the flying object having the low flight priority.

12. The information processing apparatus according to claim 11, wherein the circuitry is further configured to generate route information capable of minimizing energy required for the movement of the mobile object in each of routes for at least three or more points set in advance based on the environment map.

13. The information processing apparatus according to claim 12, wherein the environment information includes a wind speed in a vertical direction with respect to the flying object.

14. An information processing method executed by a computer, comprising:

acquiring, from a mobile object, environment information that affects movement of the mobile object;

generating route information that minimizes energy required for the movement of the mobile object in a route between a first point and a second point set in advance based on the environment information, wherein the route excludes areas having a downward air flow and includes areas having an upward air flow; and transmitting the route information to the mobile object to cause the mobile object to move along the route.

15. A non-transitory computer-readable storage medium storing computer-readable instructions thereon which, when executed by a circuitry, cause the circuitry to perform a method, the method comprising:

acquiring, from a mobile object, environment information that affects movement of the mobile object;

generating route information that minimizes energy required for the movement of the mobile object in a route between a first point and a second point set in advance based on the environment information, wherein the route excludes areas having a downward air flow and includes areas having an upward air flow; and transmitting the route information to the mobile object to cause the mobile object to move along the route.

* * * * *